US011926390B2

United States Patent
Dunlap

(10) Patent No.: US 11,926,390 B2
(45) Date of Patent: Mar. 12, 2024

(54) FLAT MOUNT BRAKE CALIPER FOR BICYCLE

(71) Applicant: SRAM, LLC, Chicago, IL (US)

(72) Inventor: Charles Dunlap, Manitou Springs, CO (US)

(73) Assignee: SRAM, LLC, Chicago, IL (US)

( * ) Notice: Subject to any disclaimer, the term of this patent is extended or adjusted under 35 U.S.C. 154(b) by 52 days.

(21) Appl. No.: 17/577,106

(22) Filed: Jan. 17, 2022

(65) Prior Publication Data

US 2023/0227120 A1 Jul. 20, 2023

(51) Int. Cl.
| | |
|---|---|
| B62L 1/00 | (2006.01) |
| B62L 1/02 | (2006.01) |
| B62L 3/02 | (2006.01) |
| F16D 55/228 | (2006.01) |
| F16D 65/00 | (2006.01) |

(Continued)

(52) U.S. Cl.
CPC ............... B62L 1/005 (2013.01); B62L 1/02 (2013.01); B62L 3/023 (2013.01); F16D 55/228 (2013.01); F16D 65/0056 (2013.01); F16D 65/0075 (2013.01); F16D 65/183 (2013.01); F16D 2055/0008 (2013.01); F16D 2055/002 (2013.01); F16D 2121/04 (2013.01)

(58) Field of Classification Search
CPC .... B62L 3/023; F16D 55/228; F16D 65/0056; F16D 65/0075; F16D 65/183; F16D 2055/0008; F16D 2055/002; F16D 2121/04
USPC ........ 188/18 A, 24.11, 24.12, 26, 71.1, 72.4, 188/72.6, 344
See application file for complete search history.

(56) References Cited

U.S. PATENT DOCUMENTS 9,533,733 B2    1/2017   Noborio et al.
9,574,631 B2 *   2/2017   Ruopp .................... F16D 65/58
(Continued)

FOREIGN PATENT DOCUMENTS

CN           112240362         1/2021
DE    102017209203 A1 * 12/2018 ................ B62L 1/00
(Continued)

OTHER PUBLICATIONS

SRAM, LLC, "MTB & Road Disc Brake Caliper Mounting Specifications", <https://www.sram.com/globalassets/document-hierarchy/frame-fit-specifications/aftermarket/disc-brake-caliper-mounting-specifications-for-road-and-mtb.pdf>, Last Checked Jan. 14, 2022.

(Continued)

*Primary Examiner* — Christopher P Schwartz

(57) ABSTRACT

Flat mount brake calipers for bicycles are described herein. An example flat mount brake caliper includes a caliper body defining a first piston cylinder and a second piston cylinder. The caliper body has a flat mount surface with a first threaded bore and a second threaded bore extending into the flat mount surface. The first and second threaded bores are configured to receive threaded fasteners to couple the caliper body to a frame of the bicycle. The first and second piston cylinders are arranged such that projections of the first and second threaded bores do not intersect the first or second piston cylinders. The flat mount brake caliper also includes a brake pad and first and second pistons disposed in the respective first and second piston cylinders to move the brake pad relative to the caliper body.

16 Claims, 6 Drawing Sheets

(51) Int. Cl.
*F16D 65/18* (2006.01)
*F16D 55/00* (2006.01)
*F16D 121/04* (2012.01)

(56) References Cited

U.S. PATENT DOCUMENTS

| | | | |
|---|---|---|---|
| 9,903,432 B2 | 2/2018 | Gallagher | |
| 10,427,751 B2* | 10/2019 | Noborio | B62L 1/005 |
| 10,442,493 B2* | 10/2019 | Meggiolan | F16D 55/225 |
| 10,890,223 B2* | 1/2021 | Ishizaki | F16D 55/228 |
| 10,926,831 B2 | 2/2021 | Kondou et al. | |
| 11,603,161 B2* | 3/2023 | Chen | F16D 65/0018 |
| 2016/0169428 A1* | 6/2016 | Nakakura | B62J 23/00 |
| | | | 188/26 |

FOREIGN PATENT DOCUMENTS

| | | | | |
|---|---|---|---|---|
| DE | 102019219811 A1 * | 6/2021 | | B62L 1/00 |
| TW | 1711556 | 12/2020 | | |
| TW | 202129168 | 8/2021 | | |

OTHER PUBLICATIONS

Benedict, Tyler, "TPE:17 Hope Tech shows flat mound RX4 four-piston disc brake calipers for SRAM, Shimano", <https://bikerumor.com/tpe17-hope-tech-shows-flat-mount-rx4-four-piston-disc-brake-calipers-for-sram-shimano/>, Last Checked Jan. 12, 2022.

* cited by examiner

US 11,926,390 B2

FLAT MOUNT BRAKE CALIPER FOR BICYCLE

FIELD OF THE DISCLOSURE

This disclosure relates generally to bicycle components and, more specifically, to flat mount brake calipers for bicycles.

BACKGROUND

Bicycles and other human powered vehicles often include disc brakes. A disc brake includes a brake rotor and a brake caliper. The brake rotor is typically mounted to a hub on a wheel of the bicycle, and the brake caliper is mounted to a fixed portion of the bicycle such as the frame. When the brake caliper is actuated, the brake caliper moves one or more brake pads into engagement with the brake rotor, which slows the brake rotor and, thus, reduces the speed of the bicycle.

SUMMARY

Disclosed herein is an example flat mount brake caliper for a bicycle. The flat mount brake caliper includes a caliper body defining a first piston cylinder and a second piston cylinder. The caliper body has a flat mount surface with a first threaded bore and a second threaded bore extending into the flat mount surface. The first and second threaded bores are configured to receive threaded fasteners to couple the caliper body to a frame of the bicycle. The first and second piston cylinders are arranged such that projections of the first and second threaded bores do not intersect the first or second piston cylinders. The flat mount brake caliper also includes a brake pad and first and second pistons disposed in the respective first and second piston cylinders. The first and second pistons are to move the brake pad relative to the caliper body.

Disclosed herein is an example flat mount brake caliper for a bicycle. The flat mount brake caliper includes an inboard caliper body, an inboard brake pad moveable relative to the inboard caliper body, and an outboard caliper body coupled to the inboard caliper body. The outboard caliper body defines a first piston cylinder and a second piston cylinder. The outboard caliper body has a flat mount surface with a first threaded bore and a second threaded bore extending into the flat mount surface. The first and second piston cylinders are arranged such that central axes of the first and second threaded bores do not intersect the first or second piston cylinders. The flat mount brake caliper also includes an outboard brake pad and first and second pistons disposed in the respective first and second piston bores. The first and second pistons are to move the outboard brake pad relative to the outboard caliper body.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
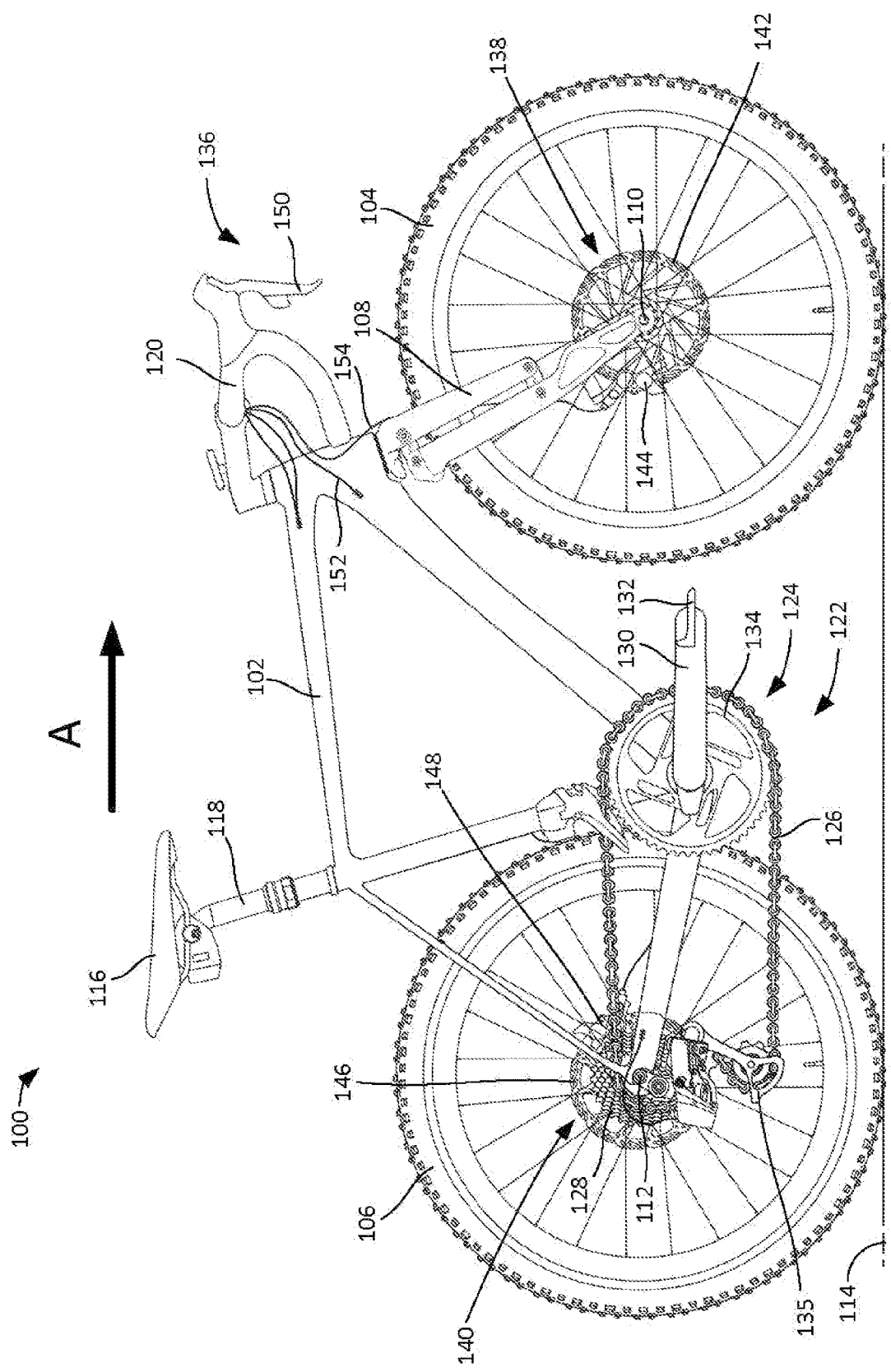
FIG. 1 is a side view of an example bicycle that may employ any example brake calipers and/or other example components disclosed herein.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Brakes on modern bicycles (including electric bicycles (e-bikes)) have evolved to utilize technology from automotive braking systems, such as disc brakes. Disc brakes have greater stopping power and deceleration control than traditional rim and cable pull brakes used in the past. The front brake and/or rear brake on a bicycle may be implemented as disc brakes. A disc brake includes a brake rotor and a brake caliper. The brake rotor is typically coupled to and rotates with a hub on a wheel of the bicycle. The brake caliper is mounted to a stationary part of the bicycle, such as the frame, near the brake rotor. When the brake caliper is actuated, the brake caliper moves two brake pads into engagement with the outer surface(s) of the brake rotor. The friction between the brake pads and the brake rotor causes the brake rotor to slow, thereby reducing the speed of the wheel and, thus, the bicycle.

Bicycle brake calipers are typically designed as one of two types: post mount brake calipers or flat mount brake calipers. Post mount brake calipers are mounted to posts on a frame (e.g., the front fork) of the bicycle. In particular, two bolts are inserted through two through-holes in the caliper body and are screwed into threaded bores/inserts in the frame, thereby mounting the brake caliper to the bicycle. Conversely, with flat mount brake calipers, two bolts are inserted through two through-holes in the frame and are screwed into threaded bores formed in the brake caliper. The threaded bores are formed in a flat mounting surface of the brake caliper. The flat mounting surface is placed against a flat surface of the frame of the bicycle such that the threaded bores are aligned with the through-holes.

Flat mount brake calipers are typically used with forks having dropouts aligned with the fork legs (because the brake caliper is better positioned relative to the brake rotor), whereas post mount brake calipers are typically used with forks with offset dropouts. Further, flat mount brake calipers are sometimes preferred by bicycle manufacturers because they do not require threaded bores or inserts to be formed in the frame or fork of the bicycle as with post mount designs. For example, forks are commonly made of carbon fiber or other strong material. Bicycle manufacturers prefer not to have to design threaded inserts in this material as it affects the structural integrity of the material and complicates the manufacturing process. Therefore, flat mount brake calipers offer a more compact and manufacturing friendly type of interface between the frame, the fork, and the assembled caliper.

Most bicycles having a flat mount caliper design have through-holes that are spaced apart according to a specific distance, referred as a flat mount standard. For example, in the bicycle industry today, the distance between the through-holes in the frame or fork is 34 millimeters (mm). Therefore, brake manufacturers often design flat mount brake calipers having the threaded bores spaced apart according to this distance so they can be used on the bicycles. Known flat mount brake calipers are designed as cylindrical 2-piston hydraulic brakes, where one piston moves the outboard brake pad and the other piston moves the inboard brake pad. The flat mount surface is on an outboard caliper portion. The threaded bores extend into the flat mount surface in a direction that is perpendicular to the direction of the piston cylinder in the outboard caliper portion. The piston cylinder is disposed between the threaded bores.

Disclosed herein are example flat mount brake calipers having multiple piston cylinders that are not intersected by central axes or projections of the threaded bores. In particular, the piston cylinder(s) are oriented or arranged to avoid intersection with the threaded bores or projections of the threaded bores. This increases (e.g., maximizes) the depth the threaded bores can extend into the caliper body without obstruction by the piston cylinders, thereby improving the bolt thread engagement and, thus, the load capacity of the flat mount interface. As used herein, the terms "projection" and "extension" can be used interchangeably and mean an imaginary extension of a major (maximum) diameter or a cross-sectional area of an opening or object as extended indefinitely in either direction along a central axis of the opening or object. As used herein, the term "inboard" means in the axial direction toward a center plane of a wheel or other rotatable object. As used herein, the term "outboard" means in the axial direction away from the center plane of the wheel or other rotatable object.

An example brake caliper disclosed herein includes an outboard caliper body and an inboard caliper body coupled to the outboard caliper body. The outboard caliper body has a flat mount surface with first and second threaded bores extending into and perpendicular to the flat mount surface. The threaded bores are used to receive threaded fasteners to mount the flat mount brake caliper to a frame (e.g., a front fork, a chain-stay, etc.) of a bicycle. When the outboard caliper body is coupled to the frame, the inboard caliper body is disposed inboard of the outboard caliper body. In some examples, the threaded bores are spaced apart according to the flat mount standard distance, such as 34 mm. The flat mount brake caliper includes an outboard brake pad and an inboard brake pad. The flat mount brake caliper can be activated (e.g., via hydraulic pressure) to move the brake pads toward each other, thereby clamping a brake rotor between the brake pad.

In some examples disclosed herein, the flat mount brake caliper is a 4-piston brake caliper. The outboard caliper body defines a first piston cylinder and a second piston cylinder. First and second pistons are disposed in the respective first and second piston cylinders. When hydraulic pressure is applied, the first and second pistons are moved outward to move the outboard brake pad toward the brake rotor. The inboard caliper body can similarly include two piston cylinders and pistons that are aligned with the piston cylinders in the outboard caliper body.

The first and second threaded bores extend into the outboard caliper body in a direction that is perpendicular to a direction in which the first and second piston cylinders extend. In some examples, one of the piston cylinders is disposed closer to the flat mount surface, such that the piston cylinders are offset relative to the flat mount surface. For example, the flat mount surface defines a first plane, and central axes of the piston cylinders defined a second plane, which is angled (non-parallel) to the first plane. In some examples, the second plane is angled by at least 10° relative to the first plane. This arrangement enables the piston cylinders to avoid interference with the threaded bores. For example, projections of the first and second threaded bores do not intersect the first or second piston cylinders (or their projections). Said another way, the first and second piston cylinders are disposed entirely between the projections and/or the threaded bores. As such, the threaded bores can extend relatively far into the caliper body, which ensures a strong bolt thread engagement.

Turning now to the figures, FIG. 1 illustrates one example of a human powered vehicle on which the example brake calipers and associated components disclosed herein may be implemented. In this example, the vehicle is one possible type of bicycle 100, such as a road bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. In some examples, the front fork 108 includes one or more suspension components (e.g., a shock absorber) to absorb shocks or vibrations. The front wheel 104 is rotatably coupled to the front fork 108 via a front hub 110. The rear wheel 106 is coupled to the frame 102 to support the rear end of the frame 102. The rear wheel 106 is rotatably coupled to the frame 102 via a rear hub 112. In some examples, one or more suspension components may be coupled between the rear wheel 106 and the frame 102 to absorb shocks or vibrations. A front and/or forward riding direction or orientation of the bicycle 100 is indicated by the direction of the arrow A in FIG. 1. As such, a forward direction of movement for the bicycle 100 is indicated by the direction of the arrow A. The bicycle 100 is shown as riding on a riding surface 114. The riding surface 114 may be any riding surface such as the ground (e.g., a dirt path, a sidewalk, a street, etc.), a man-made structure above the ground (e.g., a wooden ramp), and/or any other surface.

In the illustrated example, the bicycle 100 includes a seat 116 coupled to the frame 102 (e.g., near the rear end of the frame 102 relative to the forward direction A) via a seat post 118. The bicycle 100 also includes handlebars 120 coupled to the frame 102 and the front fork 108 (e.g., near a forward end of the frame 102 relative to the forward direction A) for steering the bicycle 100. In the illustrated example, the bicycle 100 has a drivetrain 122 that includes a crank assembly 124. The crank assembly 124 is operatively coupled via a chain 126 to a sprocket assembly 128. The sprocket assembly 128 is mounted to the rear hub 112. The crank assembly 124 includes at least one, and typically two, crank arms 130 and pedals 132, along with at least one front sprocket, or chainring 134. The example bicycle 100 may include a rear gear change device 135 (e.g., a derailleur) and/or a front gear change device to move the chain 126 through different sprockets.

The example bicycle 100 of FIG. 1 includes an example brake system 136. The brake system 136 can be used to reduce the speed of the bicycle 100. In this example, the brake system 136 includes a front brake 138 for slowing the rotation of the front wheel 104 and a rear brake 140 for slowing the rotation of the rear wheel 106. In other examples, the bicycle 100 may include only a front brake or only a rear brake. In this example, the front and rear brakes 138, 140 are implemented as hydraulic disc brakes. The front brake 138 includes a front brake rotor 142 (sometimes referred to as a brake disc) and a front brake caliper 144. The front brake rotor 142 is coupled to and rotates with the front wheel 104 on the front hub 110. The front brake caliper 144 is coupled to a structural member of the frame 102, such as to the front fork 108, adjacent the front brake rotor 142. When the front brake caliper 144 is actuated, the front brake caliper 144 moves one or more brake pads into engagement with the front brake rotor 142 to slow the front brake rotor 142 and, thus, slow the rotation of the front wheel 104. Similarly, the rear brake 140 includes a rear brake rotor 146 and a rear brake caliper 148. The rear brake rotor 146 is coupled to and rotates with the rear wheel 106 via the rear hub 112. When the rear brake caliper 148 is actuated, the rear brake caliper 148 moves one or more brake pads into engagement with the rear brake rotor 146 to slow the rear brake rotor 146 and, thus, slow the rotation of the rear wheel 106. The front brake caliper 144 and/or the rear brake caliper 148 can be implemented as a flat mount brake caliper, such as any of the example flat mount brake calipers disclosed in further detail herein.

In the illustrated example, the brake system 136 includes a rear brake actuator 150 (e.g., a lever) that is used to actuate the rear brake caliper 148. The rear brake actuator 150 is coupled to the handlebars 120. The rear brake actuator 150 is fluidly coupled to the rear brake caliper 148 via a first hydraulic line 152. In this example, the rear brake actuator 150 is actuated by moving the rear brake actuator 150 toward the grip on the handlebars 120. This actuation causes brake fluid to be pushed to the rear brake caliper 148 to provide braking pressure on the rear brake rotor 146. Conversely, the rear brake actuator 150 is de-actuated by releasing or otherwise moving the rear brake actuator 150 away from the grip, which relieves or reduces the braking pressure to the rear brake caliper 148. Similarly, the brake system 136 includes a front brake actuator (not shown as obstructed by the rear brake actuator 150) that is coupled to the handlebars 120 and used to actuate the front brake caliper 144. The front brake actuator is fluidly coupled to the front brake caliper 144 via a second hydraulic line 154. The front brake actuator and the front brake caliper 144 operate similar to the rear brake actuator 150 and the rear brake caliper 148. In the illustrated, the front and rear brake rotors 142, 146 are disposed on the left side of the front and rear wheels 104, 106 (when facing the direction A). In other examples, the front and/or rear brake rotors 142, 146 can be disposed on the right side of the front and rear wheels 104, 106, respectively.

While the example bicycle 100 depicted in FIG. 1 is a type of road bicycle, the example brakes and associated components disclosed herein can be implemented on other types of bicycles. For example, the disclosed brakes may be used on mountain bicycles, as well as bicycles with mechanical (e.g., cable, hydraulic, pneumatic, etc.) and non-mechanical (e.g., wired, wireless) drive systems. The disclosed brakes may also be implemented on other types of two-, three-, and four-wheeled human powered vehicles. Further, the example brakes can be used on other types of vehicles, such as motorized vehicles (e.g., a motorcycle, a car, a truck, etc.). The example brakes disclosed herein can be used with any road or trail conditions (e.g., hot, cold, wet, muddy, snowy, etc.).

Figure 2:
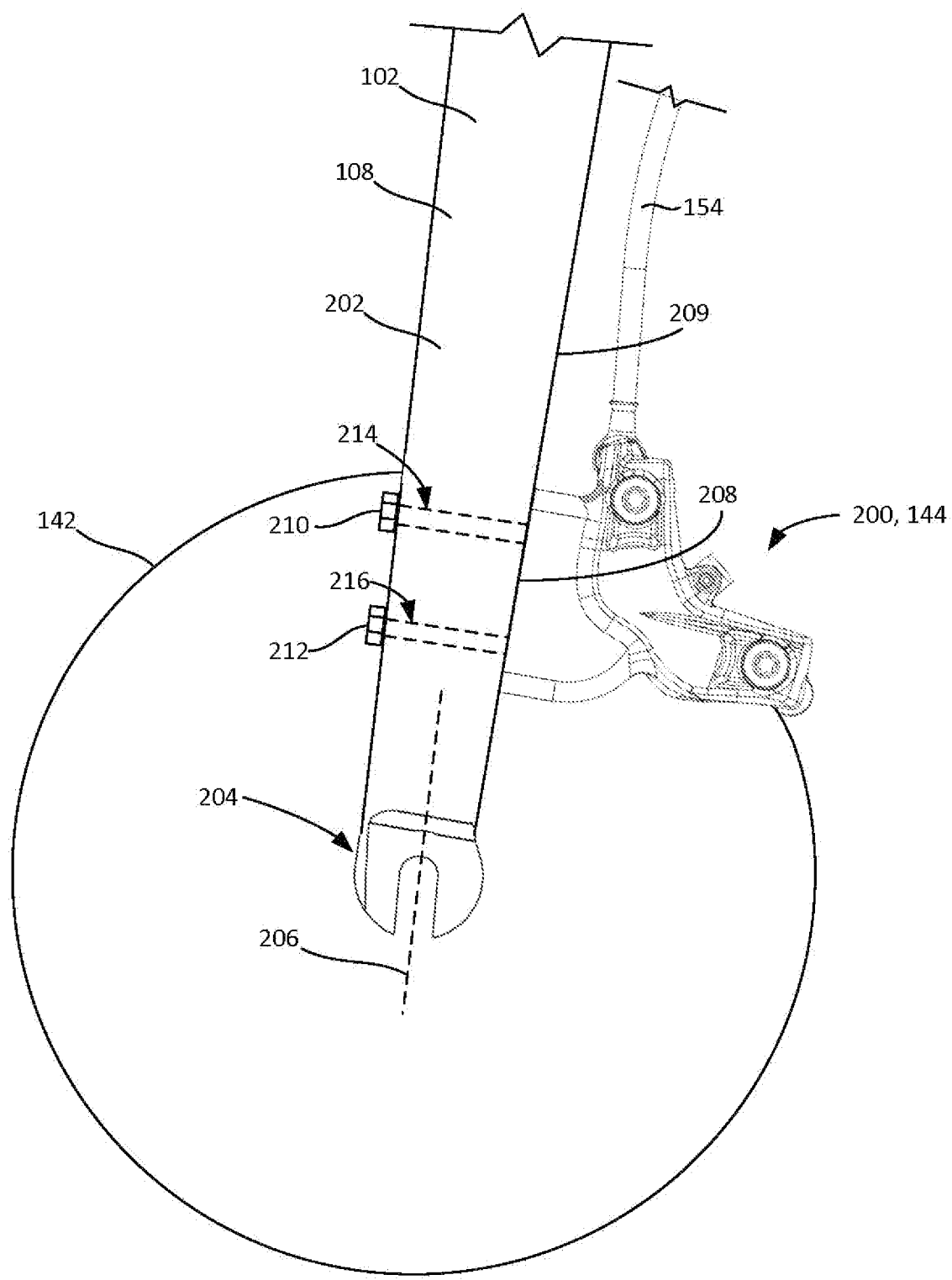
FIG. 2 is a side view of an example flat mount brake caliper mounted on an example front fork of the example bicycle of FIG. 1.

FIG. 2 is a side view of an example flat mount brake caliper 200 constructed in accordance with the teachings of this disclosure. The flat mount brake caliper 200 can also be referred to as the brake caliper 200. In this example, the flat mount brake caliper 200 is implemented as the front brake caliper 144 on the example bicycle 100 of FIG. 1. However, it is understood that the flat mount brake caliper 200 could be similarly implemented as the rear brake caliper 148.

The flat mount brake caliper 200 can be mounted to any structural member of the frame 102 of bicycle 100. In this example, the flat mount brake caliper 200 is coupled to a left leg 202 (sometimes referred to as a tube or stanchion) of the front fork 108. The left leg 202 has a dropout 204 that receives an axle of the front wheel 104 (FIG. 1). The dropout 204 can alternatively be implemented as an eyelet. In this example, the dropout 204 is aligned with a longitudinal axis 206 of the left leg 202. In some examples, flat mount brake calipers are advantageous to use on bicycles having aligned leg dropouts because they may allow the caliper to be positioned closer the fork leg or rear frame structure. Positioning the caliper closer to the fork leg or rear frame structure may reduce the need for a larger and more costly mounting structure, may reduce material and weight, and may give a more streamlined appearance. However, in other examples, the dropout 204 can be offset from the longitudinal axis 206.

An outline of the front brake rotor 142 is depicted in FIG. 2. The flat mount brake caliper 200 includes two brake pads (shown in FIG. 5) disposed on opposite sides of the front brake rotor 142. When the flat mount brake caliper 200 is actuated (e.g., via hydraulic and/or mechanical actuation), the brake pads are moved toward each other and engage opposite sides of the front brake rotor 142, thereby clamping the front brake rotor 142 between the brake pads. The frictional engagement between the brake pads and the sides of the front brake rotor 142 slows the rotation of the front brake rotor 142 and, thus, slows the rotation of the front wheel 104 (FIG. 1). When braking force is released, the brake pads retract or move outward away from the front brake rotor 142 to their open position. In the illustrated example, a portion of the hydraulic line 154 is shown coupled to the flat mount brake caliper 200.

In the illustrated example, the flat mount brake caliper 200 has a flat mount surface 208 that is coupled or mounted to a side 209 (e.g., an aft side) of the left leg 202. In this example, the flat mount surface 208 is in direct contact with the side 209 of the left leg 202. However, in other example, one or more structures (e.g., a spacer, a bracket, etc.) can be disposed between the flat mount surface 208 and the left leg 202. In another example, the flat mount surface may be a planar surface. In another example, the flat mount surface may not be a flat surface. In this example, the flat mount brake caliper 200 is coupled to the left leg 202 by first and second threaded fasteners 210, 212, such as bolts (e.g., hex head bolts, Allen bolts, hexalobular socket head bolts, etc.). The first and second threaded fasteners 210, 212 extend through respective first and second openings 214, 216 (e.g., through-holes) in the left leg 202 and are threaded (e.g., screwed) into threaded bores in the flat mount surface 208, thereby coupling the flat mount brake caliper 200 to the left leg 202. In some examples, the first and second openings 214, 216 are spaced apart according to a known mounting standard, such as about 34 millimeters (mm) (e.g., ±1 mm).

However, in other examples, the first and second openings 214, 216 can be spaced apart according to another mounting standard and/or any desired distance that is greater than or less than 34 mm (e.g., 25 mm, 30 mm, 40 mm, 45 mm, etc.). For example, larger bicycles, such as electric bicycles, may use a larger mounting standard (e.g., 55 mm) to accommodate larger, more powerful brake calipers. This type of flat mount arrangement is advantageous because threaded inserts or bores do not need to be formed in the left leg 202. Bicycle forks are commonly constructed of strong material such as carbon fiber. Bicycle manufacturers prefer not to include metal inserts or threads in the front fork because it can affect the integrity of the front fork 108. Therefore, flat mount brake calipers enable manufacturers to avoid having to include such metal inserts or threads in the front fork 108. While in this example the first and second openings 214, 216 extend entirely through the left leg 202, in other examples, the first and second openings 214, 216 may extend through only one wall of the left leg 202 (e.g., just the side 209) or through another structure (e.g., a mounting stub, a bracket, etc.) on the left leg 202.

Figure 3:
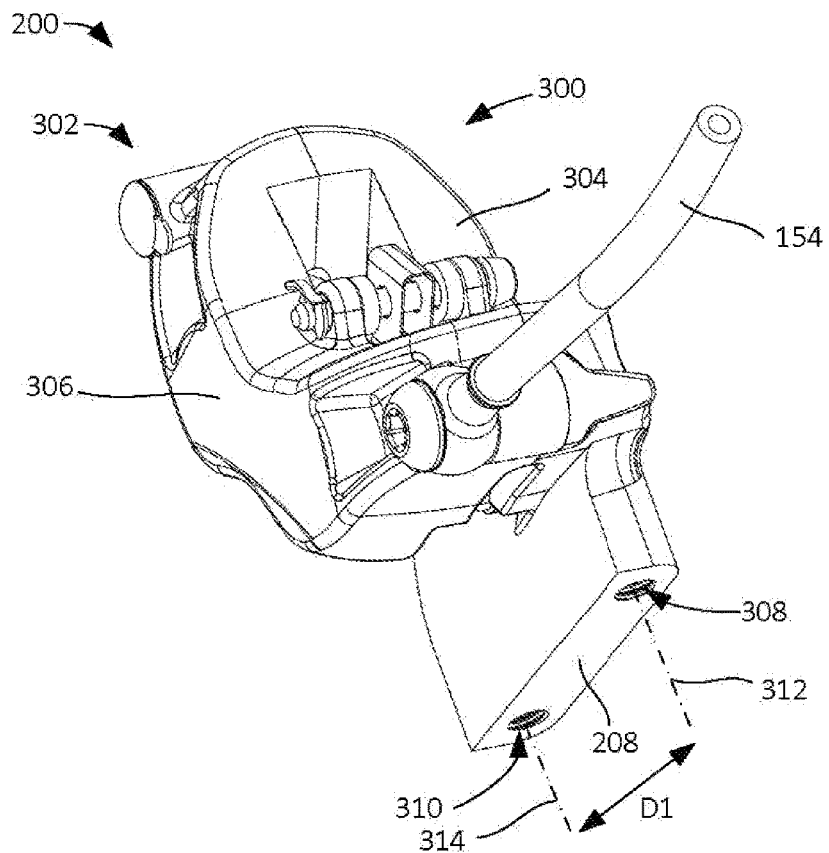
FIGS. 3 and 4 are perspective views of the example flat mount brake caliper of FIG. 2.
Figure 4:
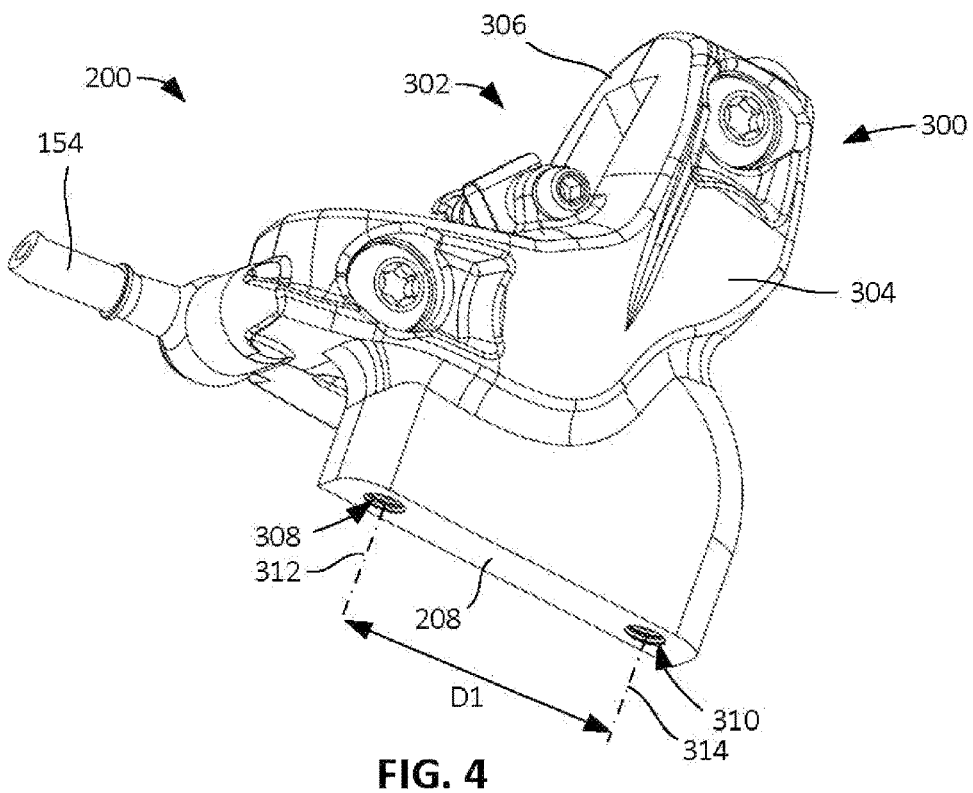

FIGS. 3 and 4 are perspective views of the example flat mount brake caliper 200. The flat mount brake caliper 200 includes an outboard caliper portion 300 and an inboard caliper portion 302 coupled to the outboard caliper portion 300. In the illustrated example, the outboard caliper portion 300 includes a first caliper body 304, referred to herein as the outboard caliper body 304, and the inboard caliper portion 302 includes a second caliper body 306, referred to herein as the inboard caliper body 306. The outboard and inboard caliper bodies 304, 306 are coupled (e.g., via one or more bolts). In some examples, the outboard caliper body 304 is constructed as a single unitary part or component (e.g., a monolithic structure). Similarly, in some examples, the inboard caliper body 306 is constructed as a single unitary part or component (e.g., a monolithic structure). When the flat mount brake caliper 200 is installed on the bicycle 100 (FIG. 1), such as shown in FIG. 2, the outboard caliper body 304 is coupled to the frame 102 of the bicycle 100, and the outboard caliper body 304 is disposed outboard of the inboard caliper body 306. In the illustrated example, a portion of the hydraulic line 154 (e.g., a hose) is shown as coupled to the inboard caliper body 306. The hydraulic line 154 provides hydraulic fluid to the flat mount brake caliper 200. The outboard caliper body 304 and the inboard caliper body 306 include one or more passages to route the hydraulic fluid to one or more piston cylinder(s)/bore(s) in the outboard and inboard caliper bodies 304, 306.

As shown in FIGS. 3 and 4, the outboard caliper body 304 has the flat mount surface 208. The flat mount surface 208 is a flat or planar surface on the outboard caliper body 304. In the illustrated example, the outboard caliper body 304 includes a first threaded bore 308 and a second threaded bore 310 extending into the flat mount surface 208. The first and second threaded bores 308, 310 extend perpendicularly into the flat mount surface 208. The first and second threaded bores 308, 310 are configured to receive the first and second threaded fasteners 210, 212 (FIG. 2). For example, the first and second threaded fasteners 210, 212 can be inserted through the openings 214, 216 (FIG. 2) in the left leg 202 (FIG. 2) and screwed into the first and second threaded bores 308, 310, which physically attaches or mounts the flat mount brake caliper 200 to the bicycle 100. In the illustrated example, the first threaded bore 308 has a first central axis 312 and the second threaded bore 310 has a second central axis 314. The first and second central axes 312, 314 are parallel to and offset from each other. The central axes 312, 314 are spaced apart by a certain distance D1. The distance D1 can be any distance. In some examples, the distance D1 corresponds to a specific mounting standard. For example, the distance D1 can be about 34 mm (e.g., ±1 mm), such that the first and second threaded bores 308, 310 align with standard mounting distance of the openings 214, 216 in the left leg 202. However, in other examples, the distance D1 can be any distance greater than or less than 34 mm, such as 25 mm, 30 mm, 40 mm, 45 mm, etc. In some examples, the flat mount brake caliper 200 can be coupled to the left leg 202 via a bracket. For example, the bracket can be coupled to the left leg 202 via a first set of threaded fasteners (e.g., screwed into the bracket and/or into the left leg 202), and the flat mount brake caliper 200 can be coupled to the bracket via a second set of threaded fasteners. In such an example, the openings 214, 216 in the left leg 202 can be offset from the first and second threaded bores 308, 310. For example, the openings 214, 216 may be spaced apart by about 70 mm, while the first and second threaded bores 308, 310 may be spaced apart by about 34 mm. Therefore, in some examples, using a bracket enables the flat mount brake caliper 200 to be used on bicycles that do not have the same mounting distance as the first and second threaded bores 308, 310.

While in this example the flat mount surface 208 is one continuous surface, in other examples, the flat mount surface 208 can be divided into two or more discrete surfaces. For example, a notch or opening can be formed in a central region of the flat mount surface 208, such that the first and second threaded bores 308, 310 are on separate flat surfaces. The flat surfaces may still be aligned, such that the flat mount surfaces lie flat or planar on the side of the left leg 202. While in this example the flat mount surface 208 is part of the outboard caliper body 304 and the hydraulic line 154 is attached to the inboard caliper body 306, in other examples, the flat mount surface 208 can be part of the inboard caliper body 306 and/or the hydraulic line 154 can be coupled to the outboard caliper body 304.

Figure 5:
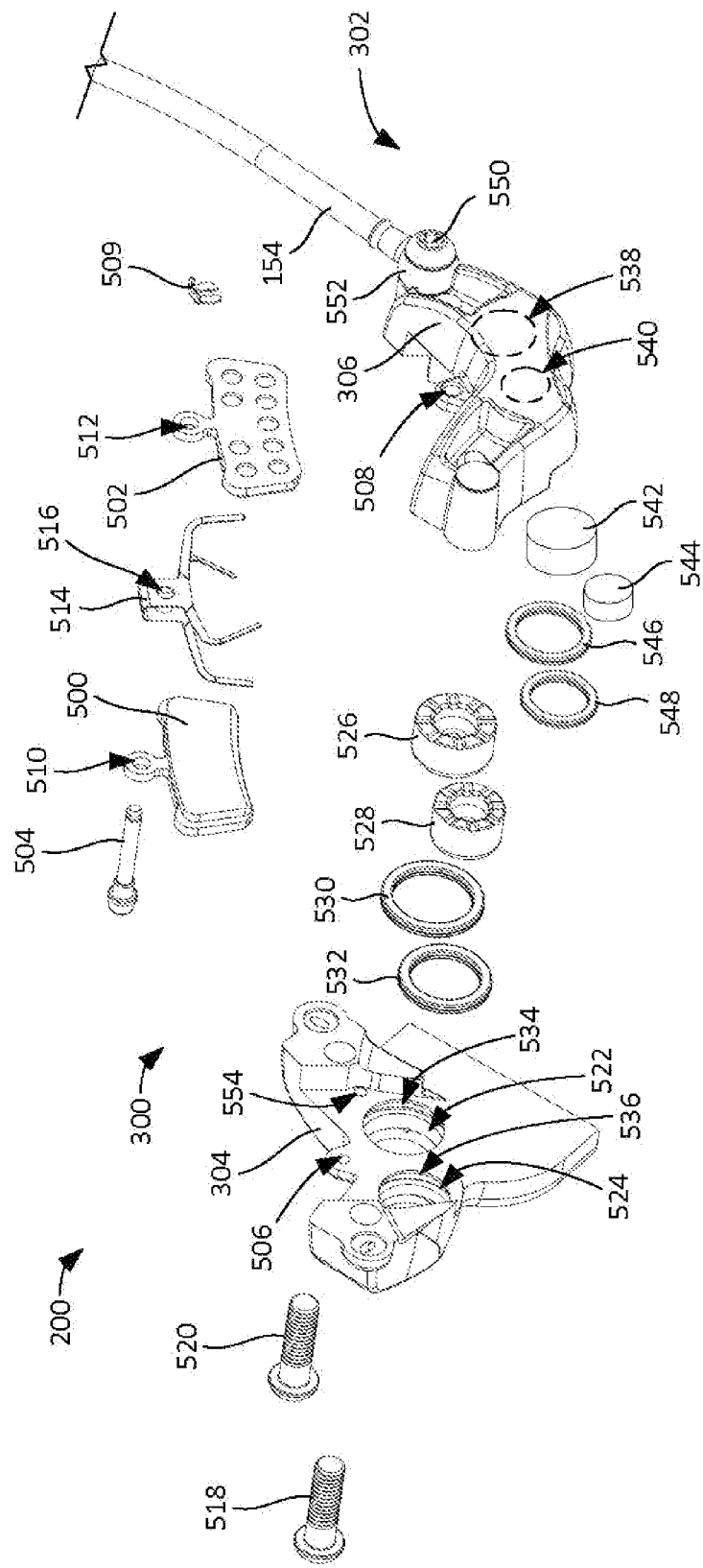
FIG. 5 is an exploded view of the example flat mount brake caliper of FIG. 2.

FIG. 5 is an exploded view of the example flat mount brake caliper 200. In the illustrated example, the outboard caliper portion 300 includes the outboard caliper body 304 and a first brake pad 500, referred to herein as the outboard brake pad 500. The outboard brake pad 500 is moveable relative to the outboard caliper body 304. Similarly, the inboard caliper portion 302 includes the inboard caliper body 306 and a second brake pad, referred to herein as inboard brake pad 502. In this example, the inboard brake pad 502 is moveable relative to the inboard caliper body 306. When the flat mount brake caliper is actuated (e.g., via hydraulic pressure), the outboard and inboard brake pads 500, 502 are moved toward each other. In other examples, one of the outboard or inboard brake pads 500, 502 can be fixed (non-movable). In such an example, the moveable brake pad engages and partially bends the brake rotor into the fixed brake pad.

Figure 7:
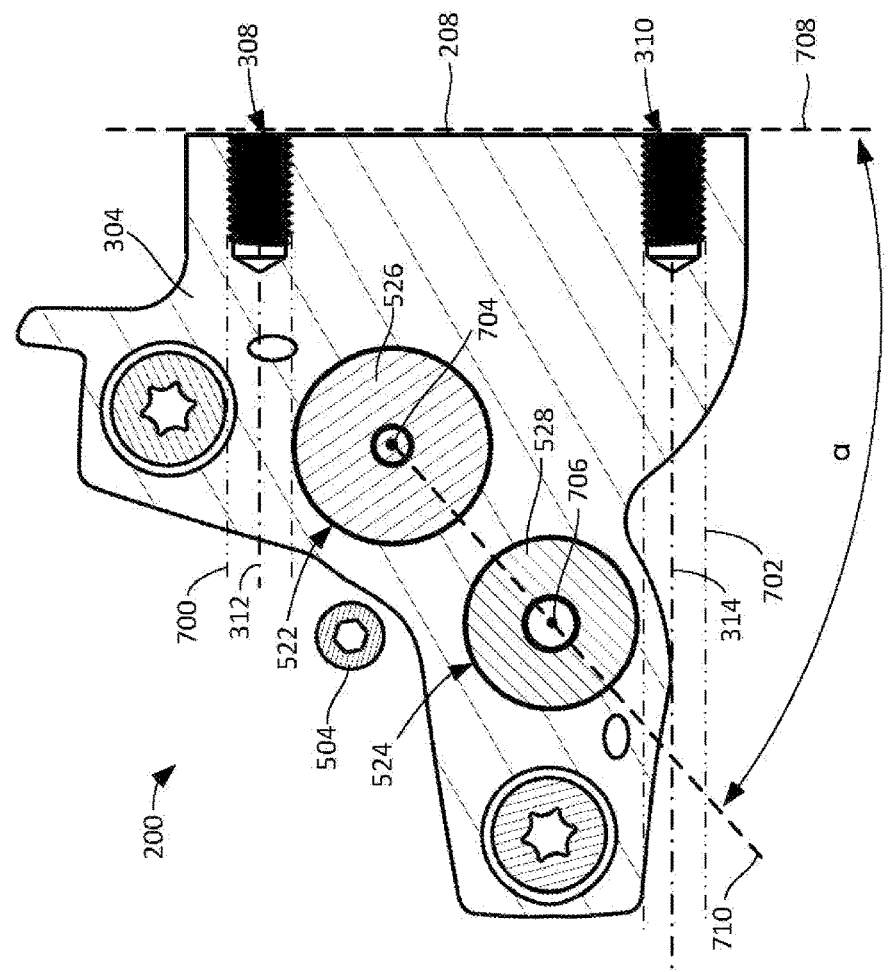
FIG. 7 is a cross-sectional view of the example flat mount brake caliper of FIG. 2 taken along line B-B of FIG. 6.
Figure 6:
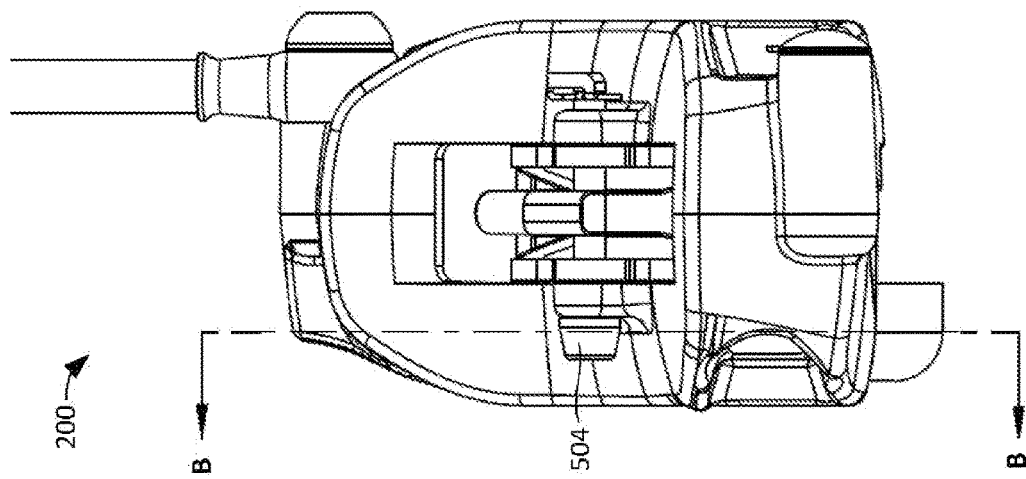
FIG. 6 is an end view of the example flat mount brake caliper of FIG. 2.

In the illustrated example, the flat mount brake caliper 200 includes a guide pin 504 (also labeled in FIGS. 6 and 7). When the flat mount brake caliper 200 is assembled, the guide pin 504 extends through an opening 506 in the outboard caliper body 304 and through an opening 508 in the inboard caliper body 306. The flat mount brake caliper 200 also includes a clip 509 (e.g., a circ-clip, an e-clip, etc.) that can be secured to the end of the guide pin 504 to prevent the guide pin 504 from being removed from the inboard caliper body 306. When the flat mount brake caliper 200 is assembled, the guide pin 504 extends through openings 510, 512 in the respective outboard and inboard brake pads 500, 502. The outboard and inboard brake pads 500, 502 are slidable along the guide pin 504 as the outboard and inboard brake pads 500, 502 are moved toward and away from each other. The guide pin 504 helps ensure the outboard and inboard brake pads 500, 502 remain parallel to each other and to the front brake rotor 142 (FIG. 1).

In the illustrated example, the flat mount brake caliper 200 includes a pad spreader 514 (e.g., a spring). When the flat mount brake caliper 200 is assembled, the pad spreader 514 is disposed between the outboard and inboard brake pads 500, 502, and the guide pin 504 extends through an opening 516 in the pad spreader 514. When the outboard and inboard brake pads 500, 502 are moved toward each other, the outboard and inboard brake pads 500, 502 compress the pad spreader 514. When the braking force is removed, the pad spreader 514 expands to move the outboard and inboard brake pads 500, 502 away from each other, thereby moving the outboard and inboard brake pads 500, 502 back to their open positions.

When the flat mount brake caliper 200 is assembled, the outboard and inboard caliper bodies 304, 306 are coupled. In this example, the outboard and inboard caliper bodies 304, 306 are coupled by first and second threaded fasteners 518, 520 (e.g., bolts or screws) that extend through the outboard caliper body 304 and into the inboard caliper body 306. In other examples, the outboard and inboard caliper bodies 304, 306 can be coupled by more or fewer threaded fasteners and/or other coupling techniques (e.g., friction fit, latches, adhesives, etc.). In some examples, one or more spacers can be disposed between the outboard and inboard caliper bodies 304, 306. When the flat mount brake caliper 200 is assembled, the outboard and inboard caliper bodies 304, 306 form the body or housing of the flat mount brake caliper 200. While in this example the body is formed by two separate bodies, in other examples, the flat mount brake caliper 200 can be formed of more than two bodies.

In this example, the flat mount brake caliper 200 is a four-piston brake caliper, meaning that each of the outboard and inboard calipers portions 300, 302 includes two pistons. Four-piston brake calipers provide higher brake forces than two piston brake calipers (where each caliper portion only includes one piston). As shown in FIG. 5, the outboard caliper body 304 defines a first piston cylinder 522 and a second piston cylinder 524 (which can also be referred to as cylinder bores or piston bores). The outboard caliper portion 300 includes a first piston 526 and a second piston 528. When the flat mount brake caliper 200 is assembled, the first and second pistons 526, 528 are disposed in the respective first and second piston cylinders 522, 524. The first and second pistons 526, 528 move the outboard brake pad 500 relative to the outboard caliper body 304. In particular, when the front brake lever is actuated, hydraulic fluid is pushed into the first and second piston cylinders 522, 524, which pushes the pistons 526, 528 inboard to move the outboard brake pad 500 toward the inboard brake pad 502. When the front brake lever is released, the first and second pistons 526, 528 move toward the outboard caliper body 304, which moves the outboard brake pad 500 or enables the outboard brake pad 500 to move away from the inboard brake pad 502.

In the illustrated example, the outboard caliper portion 300 includes first and second seals 530, 532. When the flat mount brake caliper 200 is assembled, the first seal 530 is disposed in a first recess 534 (sometimes referred to as a seal gland or groove) formed in the first piston cylinder 522 and the second seal 532 is disposed in a second recess 536 formed in the second piston cylinder 524. The pistons 526, 528 slide through the seals 530, 532, which prevents hydraulic fluid from leaking out of the piston cylinders 522, 524. In some examples, the recesses 534, 536 have larger diameters than the respective piston cylinders 522, 524.

In the illustrated example, the inboard caliper portion 302 defines a third piston cylinder 538 and a fourth piston cylinder 540 (shown in dashed lines). When the flat mount brake caliper 200 is assembled, the third piston cylinder 538 is aligned with the first piston cylinder 522, and the fourth piston cylinder 540 is aligned with the second piston cylinder 524. The inboard caliper portion 302 includes a third piston 542 disposed in the third piston cylinder 538 and a fourth piston 544 disposed in the fourth piston cylinder 540. The inboard caliper portion 302 includes third and fourth seals 546, 548 than can be disposed in the third and fourth piston cylinders 538, 540. The third and fourth pistons 542, 544 move the inboard brake pad 502.

A portion of the hydraulic line 154 (e.g., a hose) is shown in FIG. 5. The hydraulic line 154 transfers hydraulic fluid to and from the flat mount brake caliper 200. In the illustrated example, the hydraulic line 154 is fluidly coupled to the inboard caliper body 306 via a banjo bolt 550 and a fluid fitting 552. The inboard caliper body 306 includes one or more passageways that fluidly couple the opening for the banjo bolt 550 to the third and fourth piston cylinders 538, 540. Further, the outboard caliper body 304 includes one or more passageways 554 (one of which is referenced in FIG. 5) that align with one or more passageways in the inboard caliper body 306 and fluidly connect to the first and second piston cylinders 522, 524. Therefore, when the front brake lever is actuated, hydraulic fluid is pushed into the first and second piston cylinders 522, 524, which pushes the first and second pistons 526, 528 inboard to move the outboard brake pad 500 toward the inboard brake pad 502. Similarly, the hydraulic fluid is pushed into the third and fourth piston cylinders 538, 540, which pushes the pistons 542, 544 outboard to move the inboard brake pad 502 toward the outboard brake pad 500. This motion provides the clamping force to engage the front brake rotor 142 (FIG. 1) to slow the bicycle 100 (FIG. 1).

When the braking pressure is released, the pistons 526, 528, 542, 544 move back into the respective piston cylinders 522, 524, 538, 540 and the outboard and inboard brake pads 500, 502 move away from each other. In some examples, the pistons 526, 528, 542, 544 are coupled (e.g., via fasteners, adhesives, magnets, etc.) to the respective brake pads 500, 502. Therefore, when the pistons 526, 528, 542, 544 move back into the respective piston cylinders 522, 524, 538, 540 (e.g., via the reduced hydraulic pressure), the outboard and inboard brake pads 500, 502 are moved with the pistons 526, 528, 542, 54. Additionally or alternatively, as disclosed above, the flat mount brake caliper 200 can include the pad spreader 514, which provides a return biasing force to move the outboard and inboard brake pads 500, 502 away from each other after the hydraulic braking pressure is removed. Additionally or alternatively, in other examples, other types of return mechanisms can be used. While in this example the outboard and inboard caliper bodies 304, 306 each include two pistons, in other examples, the outboard and/or the inboard caliper bodies 304, 306 can include more pistons (e.g., three, four, five, etc.).

FIG. 6 is an end view of the example flat mount brake caliper 200. FIG. 7 is a cross-sectional view of the flat mount brake caliper 200 taken along line B-B of FIG. 6. FIG. 7 shows the first and second threaded bores 308, 310 extending into the flat mount surface 208 of the outboard caliper body 304. FIG. 7 also shows the first and second piston cylinders 522, 524 defined in the outboard caliper body 304.

As shown in FIG. 7, the first and second threaded bores 308, 310 extend in a direction that is perpendicular to the first and second piston cylinders. For example, the first and second threaded bores 308, 310 extend in the left/right direction in FIG. 7, whereas the first and second piston cylinders 522, 524 extend into/out of the page in FIG. 7.

In the illustrated example, the first and second piston cylinders 522, 524 are arranged such that the central axes 312, 314 (shown as dash-dot lines) of first and second threaded bores 308, 310 do not intersect the first or second piston cylinders 522, 524. Said another way, the first and second piston cylinders 522, 524 (and/or their projections which extend into and out of the page) are disposed entirely between the first and second central axes 312, 314. Further, in the illustrated example, a first projection 700 (shown as dash-dot-dot lines) of the first threaded bore 308 and a second projection 702 (shown as dash-dot-dot lines) of the second threaded bore 310 are depicted in FIG. 7. In this example, the projections 700, 702 are as large as the outermost diameter of the material removed due to the threads formed in the material. As can be seen from FIG. 7, the first and second piston cylinders 522, 524 are arranged such that the first and second projections 700, 702 do not intersect the first or second piston cylinders 522, 524. Said another way, the first and second piston cylinders 522, 524 (and/or their projections) are disposed entirely between the first and second projections 700, 702. Therefore, the first and second threaded bores 308, 310 can be extended to any depth along the projections 700, 702 without interference by the piston cylinders 522, 524. This enables the first and second threaded bores 308, 310 to extend deeper into the outboard caliper body 304, which enables a stronger interface/connection between the threaded fasteners 210, 212 (FIG. 2) and the flat mount brake caliper 200 and, thus, between the flat mount brake caliper 200 and the bicycle 100.

In the illustrated example, the first and second piston cylinders 522, 524 are arranged in an offset manner relative to the flat mount surface 208. In particular, in this example, the first piston cylinder 522 is disposed closer to the flat mount surface 208 than the second piston cylinder 524. In the illustrated example, the first piston cylinder 522 has a first central axis 704 (extending into and out of the page) and the second piston cylinder 524 has a second central axis 706 (extending into and out of the page). In the illustrated example, the flat mount surface 208 defines a first plane 708 (extending into and out of the page), and the central axes 704, 706 of the first and second piston cylinders 522, 524 define a second plane 710 (extending into and out of the page). The second plane 710 is angled relative to the first plane 708 by an angle α. In the illustrated example, the angle α is about 45°. However, in other examples, the angle α can be greater than or less than 45° (e.g., 35°, 40°, 50°, etc.). In some examples, the second plane 710 is angled by at least 10° relative to the first plane 708, which ensures sufficient offset between the first and second piston cylinders 522, 524 to reduce space (in the vertical direction in FIG. 7). In another example, the angle α can be at least 25°, which further reduces space. However, in other examples, the angle α can be any angle between 0° and 90°. This configuration or arrangement reduces the area (in the vertical direction in FIG. 7) consumed by the first and second piston cylinders 522, 524, which enables the first and second piston cylinders 522, 524 to avoid interference with the first and second projections 700, 702 of the first and second threaded bores 308, 310. In the illustrated example, the first and second threaded bores 308, 310 extend a same distance into the flat mount surface 208. However, in other examples, one of the first or second threaded bores 308, 310 can extend further than the other of the first or second threaded bores 308, 310.

In the illustrated example, the first and second piston cylinders 522, 524 have different diameters. For example, in FIG. 7, the second piston cylinder 524 has a smaller diameter than the first piston cylinder 522. In some examples, this helps arrange or fit the first and second piston cylinders 522, 524 between the first and second projections 700, 702 of the first and second threaded bores 308, 310. Also, in some examples, having a larger first piston cylinder 522 (and the first piston 526) improves force distribution across the outboard brake pad 500 for more even wear. For instance, in this example, the second piston 528 is considered the leading edge piston (which is closer to where the front brake rotor 142 enters the flat mount brake caliper 200) and the first piston 526 is considered the trailing edge piston. In general, pistons tend to move or gimbal during braking. For example, the leading edge side of the second piston 528 (the leading edge piston) can rock against the outboard brake pad 500 and generate an offset force. The first piston 526 (the trailing edge piston) rocks the same way, generating a similar offset force. These offset forces are biased to the leading edge of the outboard brake pad 500, which can cause excessive wear on the leading edge side of the outboard brake pad 500. Therefore, increasing the surface area to the first piston 526 (the trailing edge piston) helps to bias the piston forces toward the trailing edge. Additionally or alternatively, in some examples, the first and second pistons 526, 528 are positionally offset more toward the trailing edge of the outboard brake pad 500 to also help shift the force bias towards the trailing edge of the outboard brake pad 500. However, in other examples, the second piston cylinder 524 can have a larger diameter than the first piston cylinder 522 or the first and second piston cylinders 522, 524 can have the same diameter.

As disclosed above, the first and second threaded bores 308, 310 and/or their projections 700, 702 do not intersect the first or second piston cylinders 522, 524. In some examples, the first and second projections 700, 702 of the first and second threaded bores 308, 310 also do not intersect the first or second recesses 534, 536 (FIG. 5) for the seals 530, 532 (FIG. 5), which may have larger diameters than the respective first and second piston cylinders 522, 524. However, in other examples, the first and second projections 700, 702 may intersect the recesses 534, 536 but not the first and second piston cylinders 522, 524.

In the illustrated example, portions of the first and second thread bores 308, 310 and the first and second piston cylinders 522, 524 are located in the same plane, such as the cross-sectional plane shown in FIG. 7. In other examples, none of the first and second threaded bores 308, 310 and the first and second piston cylinders 522, 524 may be located along such a cross-sectional plane. However, in such an example, the first and second piston cylinders 522, 524 can still be arranged such that the first and second central axes 312, 314 and/or the first and second projections 700, 702 of the first and second threaded bores 308, 310 do not intersect projections of the first and second piston cylinders 522, 524.

Figure 8:
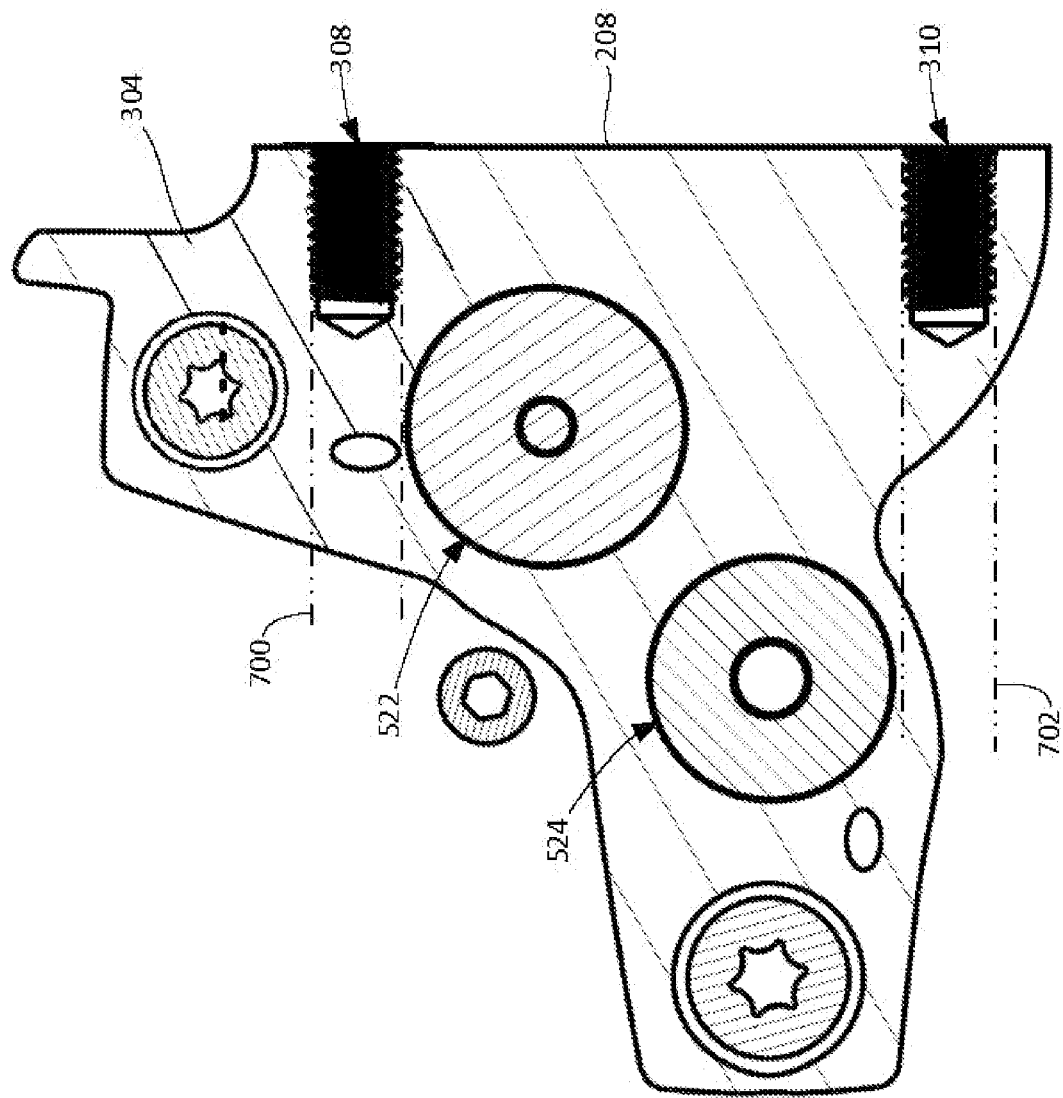
FIG. 8 shows another example arrangement of example piston cylinders of the example flat mount brake caliper of FIG. 2.

In FIG. 7, neither of the first or second piston cylinders 522, 524 is directly between the first and second threaded bores 308, 310. However, in other examples, the first and/or second piston cylinders 522, 524 can be arranged closer to the flat mount surface 208 such that at least one of the first or second piston cylinders 522, 524 is at least partially disposed between the first and second threaded bores 308, 310. For example, FIG. 8 shows an example in which the first and/or second piston cylinders 522, 524 are disposed closer to the flat mount surface 208 and/or the first and second thread bores 308, 310 extend further into the outboard caliper body 304. As shown in FIG. 8, the first piston cylinder 522 is at least partially disposed between the first and second threaded bores 308, 310. However, the arrangement or configuration of the first and second piston cylinders 522, 524 enables the first and second piston cylinders 522, 524 to avoid interference with the first and second threaded bores 308, 310 and/or their projections 700, 702. As such, the first and second threaded bores 308, 310 can extend relatively deep into the outboard caliper body 304 without interference.

The example flat mount brake caliper 200 can be constructed with the first and second piston cylinders 522, 524 closer to or further from the flat mount surface 208. The distance between the first and second piston cylinders 522, 524 and the flat mount surface 208 can be chosen based on the radius or diameter of the associated brake rotor. For example, for larger diameter brake rotors, the first and second piston cylinders 522, 524 can be disposed further from the flat mount surface 208.

In some examples, the first and second bores 310, 312 are formed (e.g., machined) directly in the material of the outboard caliper body 304. However, in other examples, mounting bores (e.g., non-threaded bores) can be formed in the outboard caliper body 304, and then inserts having threads can be disposed (e.g., mounted in) the mounting bores. The inserts include threads configured to mate with the threaded fasteners 210, 212. The inserts can be removeably inserted into the mounting bores or permanently installed. In some examples, the inserts can be constructed of a different material (e.g., a harder material) than the outboard caliper body 304). In such examples using mounting bores, projections of the mounting bores do not intersect the first or second piston cylinders 522, 524. Therefore, the mounting bores (and, thus, the inserts) can be extended to any depth along the projections without interference by the first and second piton cylinders 522, 524.

While the example flat mount brake calipers 200 are described in connection with a front brake caliper, the example flat mount brake calipers 200 can also be used as a rear brake caliper. For example, the flat mount brake calipers 200 can be coupled to a section of the frame 102 (e.g., a chain-stay) adjacent the rear brake rotor 146. In such an example, the frame 102 has openings (e.g., through-holes) that align with the threaded bores to receive threaded fasteners. The openings can be spaced apart according to a desired mounting standard.

Example systems, apparatus, and articles of manufacture for bicycles (and/or other vehicles) are disclosed herein. Examples and example combinations disclosed herein include the following:

Example 1 is a flat mount brake caliper for a bicycle. The flat mount brake caliper includes a caliper body defining a first piston cylinder and a second piston cylinder. The caliper body has a flat mount surface with a first threaded bore and a second threaded bore extending into the flat mount surface. The first and second threaded bores are configured to receive threaded fasteners to couple the caliper body to a frame of the bicycle. The first and second piston cylinders arranged such that projections of the first and second threaded bores do not intersect the first or second piston cylinders. The flat mount brake caliper also includes a brake pad and first and second pistons disposed in the respective first and second piston cylinders. The first and second pistons are to move the brake pad relative to the caliper body.

Example 2 includes the flat mount brake caliper of Example 1, wherein first piston cylinder is closer to the flat mount surface than the second piston cylinder.

Example 3 includes the flat mount brake caliper of Examples 1 or 2, wherein the flat mount surface defines a first plane, and wherein central axes of the first and second piston cylinders define a second plane. The second plane is angled relative to the first plane.

Example 4 includes the flat mount brake caliper of Example 3, wherein the second plane is angled relative to the first plane by at least 10°.

Example 5 includes the flat mount brake caliper of any of Examples 1-4, wherein the first and second piston cylinders have different diameters.

Example 6 includes the flat mount brake caliper of any of Examples 1-5, further including a first seal disposed in a first recess formed in the first piston cylinder and a second seal disposed in a second recess formed in the second piston cylinder, wherein the projections of the first and second threaded bores do not intersect the first or second recesses.

Example 7 includes the flat mount brake caliper of any of Examples 1-6, wherein the first piston cylinder is at least partially disposed between the first and second threaded bores.

Example 8 includes the flat mount brake caliper of any of Examples 1-7, wherein a distance between central axes of the first and second threaded bores is about 34 millimeters Example 9 includes the flat mount brake caliper of any of Examples 1-8, wherein the first and second threaded bores extend a same distance into the flat mount surface.

Example 10 includes the flat mount brake caliper of any of Examples 1-9, wherein the caliper body is a first caliper body and the brake pad is a first brake pad, further including: a second caliper body coupled to the first caliper body; and a second brake pad.

Example 11 includes the flat mount brake caliper of Example 10, wherein the second caliper body defines a third piston cylinder and a fourth piston cylinder, the third piston cylinder is aligned with the first piston cylinder, and the fourth piston cylinder is aligned with the second piston cylinder.

Example 12 includes the flat mount brake caliper of Examples 10 or 11, wherein, when the flat mount brake caliper is mounted to the bicycle, the first caliper body is disposed outboard of the second caliper body.

Example 13 is a flat mount brake caliper for a bicycle. The flat mount brake caliper includes an inboard caliper body, an inboard brake pad moveable relative to the inboard caliper body, and an outboard caliper body coupled to the inboard caliper body. The outboard caliper body defines a first piston cylinder and a second piston cylinder. The outboard caliper body has a flat mount surface with a first threaded bore and a second threaded bore extending into the flat mount surface. The first and second piston cylinders are arranged such that central axes of the first and second threaded bores do not intersect the first or second piston cylinders. The flat mount brake caliper also includes an outboard brake pad and first and second pistons disposed in the respective first and second piston bores. The first and second pistons are to move the outboard brake pad relative to the outboard caliper body.

Example 14 includes the flat mount brake caliper of Example 13, wherein projections of the first and second threaded bores do not intersect projections of the first and second piston cylinders.

Example 15 includes the flat mount brake caliper of Examples 13 or 14, wherein first piston cylinder is closer to the flat mount surface than the second piston cylinder.

Example 16 includes the flat mount brake caliper of Example 15, wherein the second piston cylinder has a smaller diameter than the first piston cylinder.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A flat mount brake caliper for a bicycle, the flat mount brake caliper comprising:
    a first caliper body and a second caliper body, the first and second caliper bodies configured to be on opposite sides of a brake rotor;
    the first caliper body defining a first piston cylinder and a second piston cylinder, the first caliper body having a flat mount surface with a first threaded bore and a second threaded bore extending into the flat mount surface, the first and second threaded bores configured to receive threaded fasteners to couple the first caliper body to a frame of the bicycle, the first and second piston cylinders arranged such that projections of the first and second threaded bores do not intersect the first or second piston cylinders;
    a brake pad; and
    first and second pistons disposed in the respective first and second piston cylinders, the first and second pistons to move the brake pad relative to the first caliper body.

2. The flat mount brake caliper of claim 1, wherein first piston cylinder is closer to the flat mount surface than the second piston cylinder.

3. The flat mount brake caliper of claim 1, wherein the flat mount surface defines a first plane, and wherein central axes of the first and second piston cylinders define a second plane, the second plane angled relative to the first plane.

4. The flat mount brake caliper of claim 3, wherein the second plane is angled relative to the first plane by at least 10°.

5. The flat mount brake caliper of claim 1, wherein the first and second piston cylinders have different diameters.

6. The flat mount brake caliper of claim 1, further including a first seal disposed in a first recess formed in the first piston cylinder and a second seal disposed in a second recess formed in the second piston cylinder, wherein the projections of the first and second threaded bores do not intersect the first or second recesses.

7. The flat mount brake caliper of claim 1, wherein the first piston cylinder is at least partially disposed between the first and second threaded bores.

8. The flat mount brake caliper of claim 1, wherein a distance between central axes of the first and second threaded bores is about 34 millimeters (mm).

9. The flat mount brake caliper of claim 1, wherein the first and second threaded bores extend a same distance into the flat mount surface.

10. The flat mount brake caliper of claim 1, wherein the brake pad is a first brake pad
    the second caliper body is coupled to the first caliper body and has a second brake pad.

11. The flat mount brake caliper of claim 10, wherein the second caliper body defines a third piston cylinder and a fourth piston cylinder, the third piston cylinder aligned with the first piston cylinder, the fourth piston cylinder aligned with the second piston cylinder.

12. The flat mount brake caliper of claim 10, wherein, when the flat mount brake caliper is mounted to the bicycle, the first caliper body is disposed outboard of the second caliper body.

13. A flat mount brake caliper for a bicycle, the flat mount brake caliper comprising:
    an inboard caliper body;

an inboard brake pad moveable relative to the inboard caliper body;

an outboard caliper body coupled to the inboard caliper body, the outboard caliper body defining a first piston cylinder and a second piston cylinder, the outboard caliper body having a flat mount surface with a first threaded bore and a second threaded bore extending into the flat mount surface, the first and second piston cylinders arranged such that central axes of the first and second threaded bores do not intersect the first or second piston cylinders;

an outboard brake pad; and first and second pistons disposed in the respective first and second piston bores, the first and second pistons to move the outboard brake pad relative to the outboard caliper body.

14. The flat mount brake caliper of claim 13, wherein projections of the first and second threaded bores do not intersect projections of the first and second piston cylinders.

15. The flat mount brake caliper of claim 13, wherein first piston cylinder is closer to the flat mount surface than the second piston cylinder.

16. The flat mount brake caliper of claim 15, wherein the second piston cylinder has a smaller diameter than the first piston cylinder.

* * * * *